United States Patent
Kung

(10) Patent No.: US 7,456,747 B2
(45) Date of Patent: Nov. 25, 2008

(54) METHOD AND DEVICE FOR SUPPRESSING A TRANSMITTING SIGNAL IN A RECEIVER OF AN RFID WRITE/READ UNIT

(75) Inventor: Roland Kung, Wolfhausen (CH)

(73) Assignee: Elektrobit Wireless Communications Ltd., Oulu (FI)

( * ) Notice: Subject to any disclaimer, the term of this patent is extended or adjusted under 35 U.S.C. 154(b) by 53 days.

(21) Appl. No.: 11/697,040

(22) Filed: Apr. 5, 2007

(65) Prior Publication Data
US 2007/0194887 A1    Aug. 23, 2007

Related U.S. Application Data

(63) Continuation of application No. PCT/CH2005/000495, filed on Aug. 24, 2005.

(30) Foreign Application Priority Data

Oct. 8, 2004    (CH) .................................. 1660 04

(51) Int. Cl.
    *G08B 13/14*    (2006.01)
(52) U.S. Cl. ................. 340/572.5; 340/572.8; 340/10.1; 340/10.2; 340/10.51; 455/78; 455/79; 455/136; 455/278.1; 455/296
(58) Field of Classification Search .............. 340/572.5, 340/572.4, 572.8, 10.1, 10.2, 10.51; 455/78, 455/79, 136, 278.1, 296
See application file for complete search history.

(56) References Cited

U.S. PATENT DOCUMENTS

| 4,594,479 A | 6/1986 | Farrow et al. |
| 5,691,978 A | 11/1997 | Kenworthy |
| 6,229,992 B1 | 5/2001 | McGeehan et al. |
| 6,265,962 B1 * | 7/2001 | Black et al. ................. 340/10.2 |
| 2001/0001758 A1 | 5/2001 | Greeff et al. |
| 2002/0072344 A1 * | 6/2002 | Souissi ........................ 455/296 |
| 2004/0106381 A1 | 6/2004 | Tiller |

FOREIGN PATENT DOCUMENTS

| WO | WO 0021204 | 4/2000 |
| WO | WO 0052838 | 9/2000 |

* cited by examiner

*Primary Examiner*—Tai T Nguyen
(74) *Attorney, Agent, or Firm*—Maginot, Moore & Beck

(57) ABSTRACT

A method and apparatus is disclosed for operating an RFID read/write unit with transmitting signal suppression. The RFID read/write unit comprises a radio frequency part including a transmitter and a receiver, and a baseband part based on digital signal processing. The method involves producing an amplitude and phase weighted copy of a transmitting signal, namely a compensation signal, with the baseband part. After linear modulation of the compensation signal, a resultant signal at an input of the receiver is subtracted in an addition stage from a spurious coupling signal. The transmitting signal has an auxiliary signal impressed upon a carrier signal from the RFID read/write unit with a frequency offset fd, for the purpose of processing without any DC voltage in the receiver downstream of an RX converter. The input of the receiver comprises a turn-on and turn-off attenuation element which protects the radio frequency part.

11 Claims, 2 Drawing Sheets

US 7,456,747 B2

METHOD AND DEVICE FOR SUPPRESSING A TRANSMITTING SIGNAL IN A RECEIVER OF AN RFID WRITE/READ UNIT

CROSS-REFERENCE TO RELATED APPLICATIONS

This application is a continuation of international application number PCT/CH2005/000495, (publication number WO 2006/037241) filed Aug. 24, 2005, and which claims priority from CH 1660/04, filed Oct. 8, 2004.

FIELD

The invention falls within the field of communication technology. It relates to a method and an apparatus for operating an RFID read/write unit with transmitting signal suppression, where the RFID read/write unit comprises a radio frequency part having a transmitter and a receiver, and a baseband part based on digital signal processing.

BACKGROUND

RFID systems comprise an RFID read/write unit (reader) and electronic tags. The latter can operate passively, i.e. without a battery, and are therefore reliant on the permanent presence of a carrier signal transmitted by the RFID read/write unit, also called a power carrier. The carrier signal simultaneously serves as a radio frequency oscillator for the tag. Although semi-passive tags have a battery, they likewise require a permanently transmitted carrier signal instead of a radio frequency oscillator for modulation. In this context, RFID systems with ranges of several meters use UHF frequencies or microwave frequencies. The RFID read/write unit itself comprises a baseband part and a radio frequency part (RF part) having a transmitter and a receiver.

To achieve reading distances in the region of several meters for passive electronic tags and in the region of several tens of meters for semi-passive electronic tags, a transmitting signal provided by a transmitter (TX) needs to be produced and emitted at a power of approximately 1 watt (30 dBm). A significant part of this comparatively powerful transmitting signal is then injected spuriously directly into the receiver (RX), see FIG. 1, the coupling paths 28, 29 and the reflection at a reflector 27. On the other hand, the receivers in the RFID read/write units need to detect the low levels of the response signal which is reflected unamplified from the tags only after modulation of the carrier signal with response data. Such a resultant, required wide dynamic range in the receiver in the RFID read/write unit represents an enormous demand on any bidirectionally operating system. In this case, the RFID read/write unit can either be operated using a single antenna, with the transmitter and the receiver being decoupled by a circulator, or two directly adjacent antennas are used. In both cases, the isolation between the transmitter and the receiver is known to be low; typically, such isolation is merely around 20 dB.

The transmitting signal injected directly from the transmitter into the receiver is therefore not only very powerful but also unwanted, since it results in intermodulation with the response signal from an electronic tag in the radio frequency stages of the receiver and hence reduces the sensitivity of the receiver. In other words, the isolation from the transmitter (TX) to the receiver (RX) for an RFID read/write unit is much too low for long ranges in practice in the UHF and microwave domain. The isolation is determined by the design of the RFID read/write unit and particularly by the technology of the circulator at the antenna output or by the arrangement of the transmission and reception antennas used. The use of a circulator can subsequently be handled in the same way as the use of separate antennas. The latter is discussed here as representative of both uses.

A numerical example demonstrates the problem explained above as follows: if the transmitting power is 30 dBm with isolation of 20 dB, this results in a spurious signal of +10 dBm at the receiver input. The useful signal emitted by a passive electronic tag is only just −70 dBm, however, in the UHF domain at a distance of approximately 4 m. The high level of +10 dBm for the transmitting signal injected directly into the receiver thus overdrives the input amplifier of any RFID read/write unit, which is typically a low noise small signal amplifier.

Intermodulation frequencies arise between the injected transmitting signal and the receiving signal from electronic tags or the signals from other simultaneously active RFID read/write units. If the receiving signal is digitized for further evaluation, a dynamic range of 80 dB additionally produces a problem with the available resolution in the case of the 14 to 16 bit analog/digital converters which are usual for this. If one wishes merely to solve the problem by improving the components, the demands on the RF components and the AD converter become very high and unappealing, particularly as far as linearity and drawn supply current are concerned. Rejection of or electronic compensation for the injected transmitting signal is thus necessary in order to achieve long ranges.

A known reception architecture therefore provides what is known as direct conversion stage (DCS) in order to move from the radio frequency (RF) to a baseband. If the data on the electronic tag are modulated and reflected without a direct-current voltage component then the dynamic range for the AD converter can be alleviated by filtering away the direct voltage component (DC) after down conversion in the receiver's DCS. In the RF input part of a receiver, however, nothing changes about the intermodulation situation, and electronic compensation continues to be required. Since removing the DC voltage component eliminates the contribution of the injected transmitting signal in baseband, said contribution needs to be detected and processed in an additional circuit. In practice, a maximum receiving signal with a level of −10 dBm for example, would be desirable. On the basis of the above calculation, an isolation of at least 20 dB is therefore additionally necessary.

US 2004/0106381 and U.S. Pat. No. 6,229,992 B1 propose measuring the injected signal in the receiver, comprising a reception antenna 11, an additional stage 8, an RX converter 4 and an AD converter 2 in FIG. 2, and adding a compensation signal, which is derived directly from the transmitting signal in the RF part, in the reception path shown.

As is known, a read unit 19 comprises a software defined baseband part 1 (SDR) and an RF part 18, as shown in FIG. 2. In such SDR based transmission/reception installations, the complex value signals are generated respectively processed purely by computational means in a signal processor 6 to the extent that they now need merely be shifted by means of linear converters (up converter or down converter) to, or from, the radio frequency band (RF band). A TX converter 5 in the transmitter is fed with a complex baseband signal (inphase and quadrature signal) which is output by the signal processor 6 via a dual digital/analog (D/A) converter 3. The output signal is forwarded to a transmission antenna 12 via a directional coupler 7. From a reception antenna 11, the receiving signals are converted into a complex baseband signal (inphase and quadrature signal) by means of an RX converter 4 and are forwarded to a dual A/D converter 2 and accepted by the signal processor 6. In the conventional solution, the transmitting signal is obtained from the output RF signal from the directional coupler 7 and is weighted in the vector modulator 10 with the correction values for phase and amplitude by the DSP 6 using a slow D/A converter 9 and is supplied to the receiving signal in an addition stage 8 for the purpose of compensation.

In a first step of the reading operation, the receiving signal is usually digitized and analyzed over a time interval T0 in a brief Listen Before Talk Phase (LBT phase) of a reading request cycle while the transmitter in a first RFID read/write unit is turned off. This signal contains the request signals from further RFID read/write units, and it is possible to decide whether or not the transmitter in the first RFID read/write unit can be turned on. If the first RFID read/write unit is switched to transmission after the LBT phase, its own receiver must first of all compensate for the injected TX signal in order to achieve a high level of sensitivity.

The compensation signal is obtained from the transmitting signal by adjusting the gain and phase (gain/phase adjuster). This technique is known as adaptive filtering. In this context, the amplitude and phase are adjusted using what is known as the vector modulator 10 totally in the RF domain. The components for outputting the transmitting signal, for addition in the reception path, and also the vector modulator 10 are RF components, however, which themselves have inaccuracies and features which are not ideal. Immediately effective (instantaneous) reduction of the coupling therefore appears possible only with difficulty and in practice by application of iterative cycles of measurement/compensation/measurement, etc.

U.S. Pat. No. 6,229,992 proposes the explicit use of a digital signal processor (DSP) for controlling the rejection, in order to control these cycles. Before each reading operation, a calibration phase is required. If frequency hopping (FH) is used in accordance with the current radio specifications, the calibration needs to be carried out continuously for a number of frequencies. The calibration must additionally be carried out in harmony with the Listen Before Talk (LBT) processes which are to be used according to more recent radio specifications. When these known methods are used, additional loading on the channel arises in any case, and there is a loss of valuable transaction time with electronic tags. U.S. Pat. No. 5,691,978 proposes combining antenna isolation, analog RF rejection and a digital echo canceller in baseband in order to achieve a high level of isolation. The effort for this is considerable and makes no sense in economic terms for an RFID read/write unit.

A common feature of all of these known methods is that, if a receiver designed on a DCS basis is used, it will be necessary to evaluate a DC voltage signal (DC signal) in order to obtain information about the amplitude and phase of the injecting transmitting signal. However, this DC signal is in turn itself subject to errors as a result of cross-coupling effects in the RF mixers in the RX converter. The same applies to methods which measure detection of crosstalk using a conventional envelope detector. Additional problems arise when other RFID read/write units unintentionally transmit on the same frequency channel at the same time, since their transmission frequencies possibly differ only slightly and thus corrupt each measured value. If a transmitting signal from another interfering RFID read/write unit is present then this means that it is sometimes not possible to carry out calibration at all. This problem is either solved by the specification for use of LBT or by synchronizing the entire RFID read/write unit network.

SUMMARY

It would be advantageous to provide a method and an apparatus for operating an RFID read/write unit with transmitting signal suppression further such that receiving signal components which interfere with useful operation of the RFID read/write unit can be largely rejected in a simple manner.

In line with embodiments of the invention, a baseband part in an RFID read/write unit produces, as a compensation signal, an amplitude and phase weighted copy of a transmitting signal, which compensation signal is subtracted following linear modulation at an input of a receiver in an addition stage from a spurious coupling signal between the transmitter and the receiver. What is important in this context is that the transmitting signal (and hence also the compensation signal, which is a weighted copy, of course) has an auxiliary signal impressed upon the carrier signal from the RFID read/write unit with a frequency offset fd for the purpose of processing without any DC voltage in the receiver downstream of an RX converter. One particular advantage in this case is that only linear components are required for the method, in order to provide improved attenuation of coupling transmitting signals in the receiver. For the first time, this improved attenuation now allows the entire reception part to be designed for a definitively reduced dynamic range for the input signal which is to be expected. Accordingly, such dynamic range alignment allows increased sensitivity to all response signals from electronic tags to be achieved. This is therefore advantageously supporting reliable identification and processing of such response signals.

In addition, the operation of the inventively used digital production of the compensation signal in the baseband part of the RFID read/write unit is significantly less subject to error than the components operating in the radio frequency domain which are used in the prior art. In addition, the inventive method uses an auxiliary signal to provide more or less direct compensation for coupling transmitting signal components, in contrast to the known methods. To this end, in a first step the compensation signal can be turned off in order to measure the amplitude and phase of the injected signal and to provide them in the signal processor for the purpose of calculating the compensation variables. When the compensation signal has been turned on, the rejection becomes effective immediately and can be increased further using control loop methods.

In addition, the inventive method is used to compensate directly for external reflections or device-internal crosstalk between assemblies in the transmission and reception paths. In one embodiment of the inventive method, an attenuation element, which has been turned on in the input of the receiver first of all, prevents overdriving and hence intermodulations therein in order to provide a first weighting for the copy of the transmitting signal. The attenuation element is then turned off, and the inventive method permanently ensures that there is an appropriate weighting for the copy of the transmitting signal.

Advantageously, the carrier signal is amplitude modulated with a small swing or is combined with a weak sideband signal, for the purpose of ascertaining the weights for signal suppression.

In at least one embodiment of the invention, the carrier signal is for a short time shifted in frequency in order to be able to determine the weights for the purpose of rejecting the carrier signal at exactly the carrier frequency used in the RFID read/write mode.

One particular advantage is that using the inventive method does not exert any influence on the regular operation for electronic tags, since these tags perceive the auxiliary signal as too weak a signal to undergo impairment.

In at least one embodiment of the invention, the auxiliary signal is additionally modulated with a pseudo random sequence such that the auxiliary signal is perceived by tags and other RFID read/write units only as a weak noise signal, and only the producing RFID read/write unit can reverse this modulation in its receiver.

Other advantageous embodiments of the inventive method are described below.

In embodiments of the inventive apparatus, the baseband part is able to be used to implement not only the carrier signal but also an auxiliary signal and a compensation signal, whereas the RF part comprises only known components used in conventional RFID read/write units. In one embodiment of the inventive apparatus, a number of coupling paths can be compensated for by at least one expansion stage for producing weighted copies of the transmitting signal in the baseband part.

BRIEF DESCRIPTION OF THE DRAWINGS

Embodiments of the invention are explained by way of example below with reference to figures. Identical elements are in principle denoted by the same reference symbols in the figures. On a purely schematic basis.

DESCRIPTION

Figure 1:
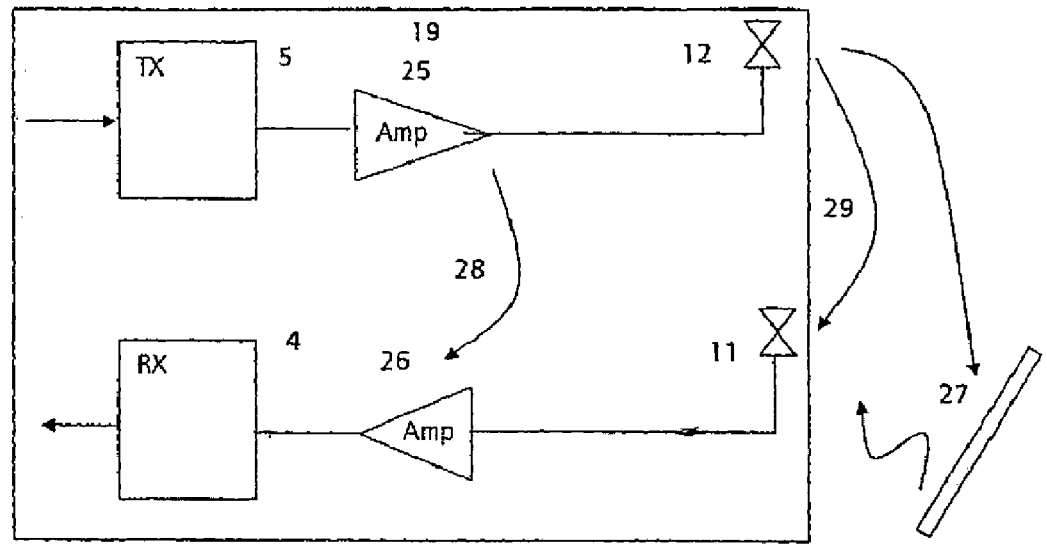
FIG. 1 shows a known RFID read/write unit architecture with a few obvious coupling paths.
Figure 2:
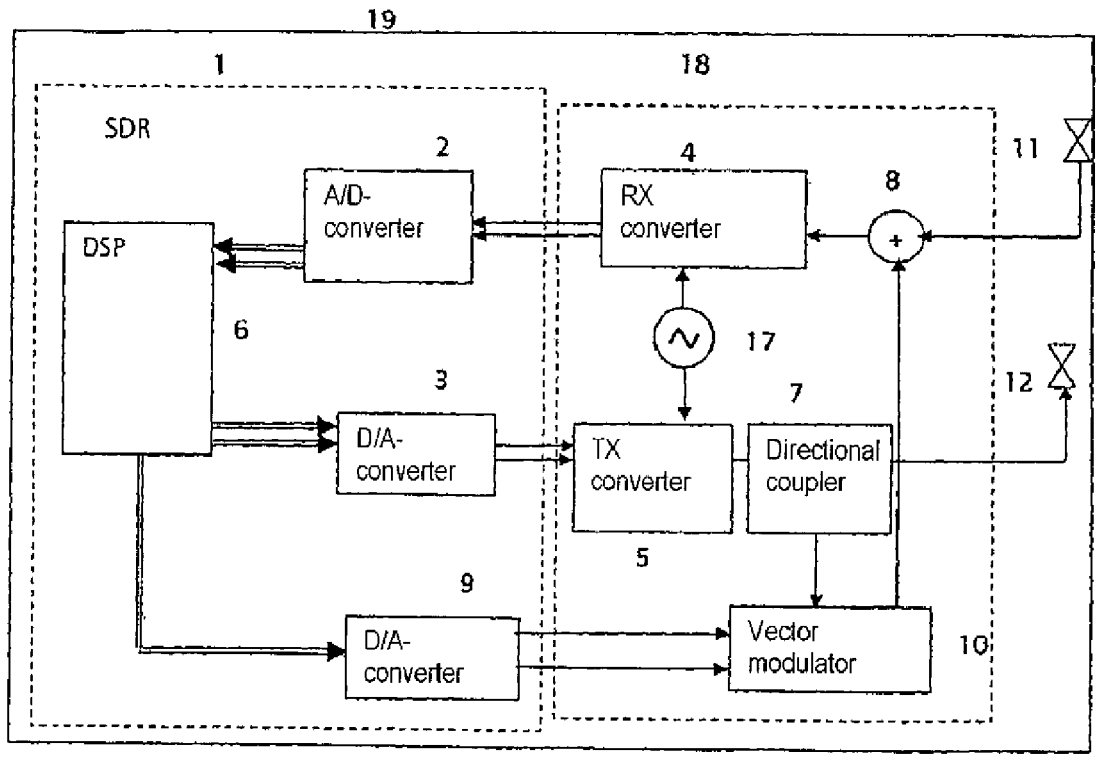
FIG. 2 shows a previously used apparatus for compensating for a coupling signal from a transmitter antenna to a receiver antenna.
Figure 3:
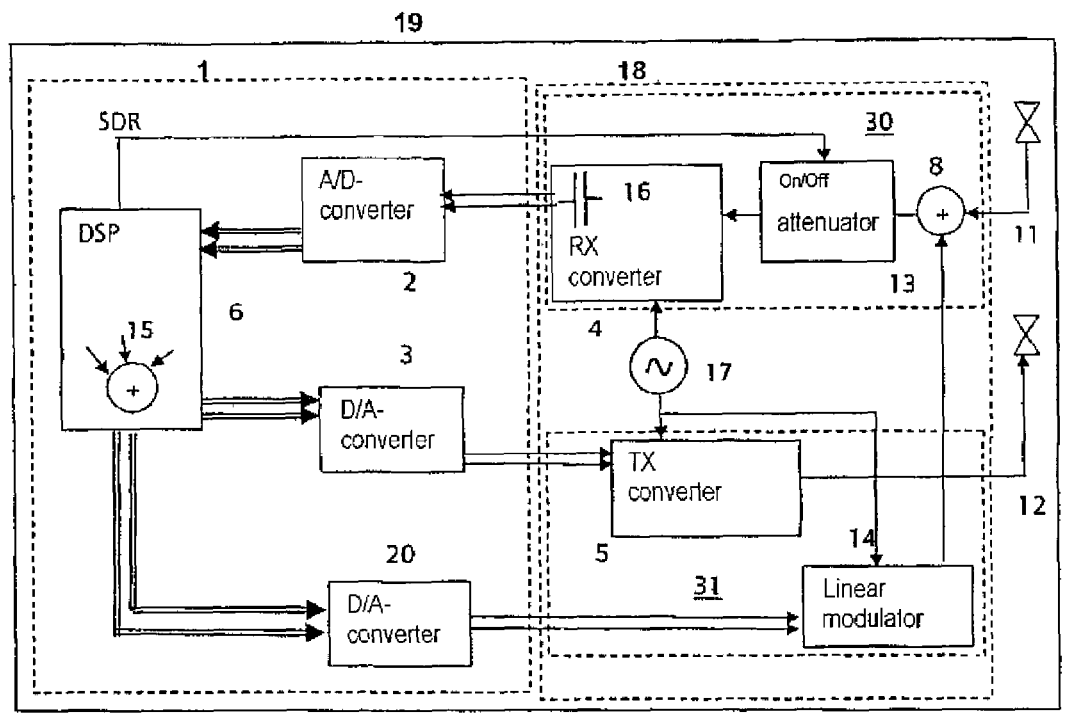
FIG. 3 shows an inventive apparatus for compensating for coupling signals.

Disclosed herein is a novel method and an apparatus for an RFID read/write unit in order to produce advantageous compensation for a transmitting signal coupled from a transmitter into a receiver. FIG. 3 shows an SDR architecture which has been modified over a conventional arrangement and which is likewise based on the DCS principle with a TX converter 5 and an RX converter 4, as described above. For frequency conversion, a fixed frequency oscillator 17 is used. To select various frequency channels or to use frequency hopping, the transmitting signal generated in the signal processor 6 is produced precisely and directly by digital synthesis. In particular, it is not necessary to switch assemblies in the RF part 18 for this purpose. While the transmitter with the TX converter 5 is active and is outputting power, the receiver downstream of the RX converter 4 digitizes and analyzes the receiving signal over a time interval T1 in order to be able to calculate a compensation signal which is effective as immediately (instantaneously) as possible. In this context, the amplitude and phase of the receiving signal is calculated relative to the transmitted carrier signal. The compensation signal is produced in the digital baseband domain of the transmission path, within the signal processor 6. Essentially, an amplitude and phase processed copy of the transmitting signal is generated, such that the addition in an addition stage 8 just cancels the injected signal. The compensation signal can also be extended for a plurality of spurious signals in the case of more complex coupling situations (see also coupling paths 28 and 29 in FIG. 1) by means of multiple implementation 15, since in addition to the coupling via the antenna 12 of the transmitter 31 and the antenna 11 of the receiver 30, a spurious signal can also be produced between the transmission amplifier 26 and the reception amplifier 25 (cf. FIG. 1). The compensation signal, like the carrier signal 21, is produced by means of digital computation (Direct Digital Synthesis) and is output via the separate, fast D/A converter 20 (FIG. 3) and shifted to the transmission or reception frequency (identical in DCS receivers) in a linear modulator 14. This signal is then added to the receiving signal in the addition stage 8.

One particular embodiment of the invention allows DC-free operation of the receiver without additional measurement apparatuses. This is achieved by virtue of a weak auxiliary signal 22 being modulated onto or added to the carrier signal 21, FIG. 4, used to read electronic tags. The auxiliary signal 22 has its spectrum and level designed such that it does not interfere with useful operation in electronic tags, as shown graphically in FIG. 4 by way of example. In one simple embodiment, this auxiliary signal may be a sinusoidal signal of a frequency fd at the band limit, for example, which amplitude modulates the carrier signal 21 only weakly. However, the auxiliary signal 22 is chosen to be much stronger than the response signals 24 reflected by electronic tags, such that the receiver does not have to operate at the limit of sensitivity in order to determine the compensation signal.

Figure 4:
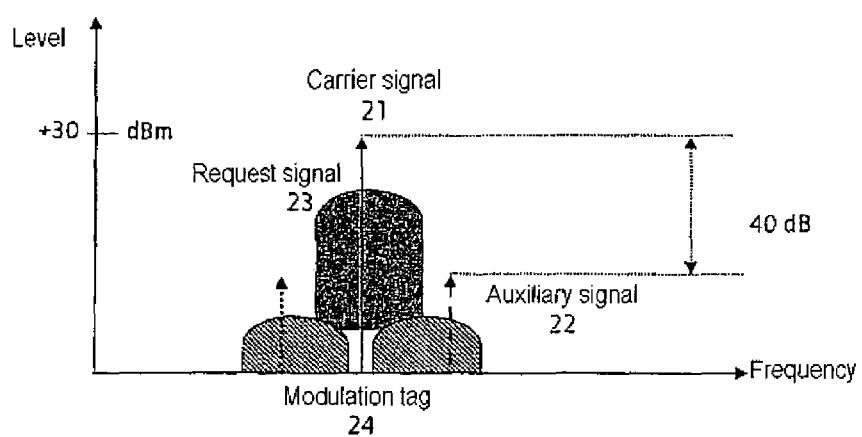
FIG. 4 shows a spectrum with a transmitting signal from the read unit, a response signal from electronic tags and an inventive, exemplary auxiliary signal.

As an exemplary embodiment, it is possible to consider the level plan from FIG. 4, in which the auxiliary signal 22 is 40 dB weaker than the carrier signal 21. The compensation signal is in turn an amplitude and phase processed copy of the carrier signal 21 provided with the auxiliary signal 22.

In line with at least one embodiment of the invention, at the start of carrier compensation a fixed attenuation element 13 (e.g. 20 dB attenuation) is connected to the reception input in order to protect the RF reception amplifier in the RX converter 4 reliably against overdrive. That component of the carrier signal 21 which is injected at the receiver input 11 thus has a level of approximately 10 dBm at the beginning. The level of the auxiliary signal 22, or the degree of modulation, is in practice measured such that this auxiliary signal 22 can still be measured precisely in its spectral domain even downstream of the connected attenuation element 13. The auxiliary signal 22 appears as an AC signal of frequency fd, and not as a DC voltage, in a receiver 30 downstream of the direct conversion stage (DCS) in the RX converter 4. This has the advantage that the DCS output of the RX converter 4 can be operated in alternating-current voltage (AC) coupled mode as desired. This means that it is a simple matter to use a high pass filter 16 to remove occurring DC offsets from the mixer stages in the RX converter 4 and naturally the resulting component of the carrier signal 21 itself which limits dynamic range. This is not a problem from the point of view of the useful signal, the modulation signal 24 for electronic tags, since this is normally encoded without DC term.

Alternatively, a DC component can also be corrected in known fashion using DC compensation in baseband for the part which comes from the useful signal. Evaluation of the auxiliary signal 22 using DSP 6 is possible with flexibility and precision. The linear modulator 14 required for producing the compensation signal can easily be produced discretely or as an integrated circuit with sufficient accuracy to achieve immediately effective attenuation of 20 dB and more. The noise signal contribution by the linear modulator 14 is also no greater than in the case of the conventional method using a vector modulator. In both embodiments, the noise level is around −156 dBm/Hz, for example, which gives a typical sensitivity of −80 dBm.

This means that the embodiment described can be used to achieve an instantaneous improvement in isolation, even before the first requested electronic tags reflect their weak response signal. Following this instantaneous compensation, the connected attenuation element 13 at the receiver input can be turned off so as now to obtain full reception sensitivity, but without the reception amplifier being overdriven. The couple transmitting carrier signal 21 which has now been compensated for with instant effect continues to remain reduced to a harmless level below −10 dBm, for example.

Since electronic tags or RFID read/write units can move during a request, the coupled transmitting us signal is temporally variable in relation to the carrier signal 21. Continuous measurement and tracking of the noise rejection is required during operation and is a simple matter using the auxiliary carrier 22. Owing to the fact that after the instantaneous initial compensation a receiver can operate in the correct signal range, with much less intermodulation than in the uncorrected case, this control loop is now operable in a better way. Naturally, in one variant embodiment it is also possible to produce an even better result with the attenuation element 13 turned on first of all, before this attenuation element 13 is turned off.

In different variant embodiments, the auxiliary signal 22 can be added to the carrier signal 21 in suitable fashion by adding it as a single sideband signal, or can be produced as a dual sideband signal through amplitude modulation of the carrier signal 21, or can be characterized by other modulation forms. Generation of the auxiliary signal 22 is precise in terms of amplitude and phase at all times, because said signal is generated purely computationally in the signal processor 6. The SDR architecture 1 allows almost any signal shape to be produced, which signal shape can also be adapted to different circumstances, parameters or system requirements at any time by loading new software. No special or critical RF components are required in the RF part 18. The apparatus is therefore easily adapted to different current and future standards in the RFID domain, e.g. ISO-18000 standards or Electronic Product Code (EPC) classes.

Another embodiment of the invention involves modulating a pseudo noise (PN) sequence onto the auxiliary carrier 22. This causes spectral spreading of the auxiliary carrier 22 and distributes it in noise form below the levels of the useful spectra of the tag modulation 24 and of the request signal 23. This reduces the generation of spurious interference caused by the auxiliary signal 22 in electronic tags or in other RFID read/write units. Since the modulating RFID read/write unit knows the pseudo noise sequence, it can reverse its own spreading. In addition, with suitable selection of the parameters of the PN sequence, the coupled signals coming from multipath propagation, that is to say from the signal propagation between the RFID read/write unit and the electronic tag (coupling paths via a reflector 27, FIG. 1), can be identified and hence also compensated for better. This may be particularly advantageous in environments with metal reflectors 27, such as factory floors. The receiving signal is resolved into the individual signal paths of the multipath propagation in the receiver baseband part 1 in known fashion through correlation with the pseudo noise sequence.

For systems which use frequency hopping (FH), the ascertained weights for producing the compensation signal for any frequency which is selected can be stored in the signal processor 6. When the same frequency is next visited, the stored value can be used as a good starting value for the further compensation.

For applications which require greatly frequency dependent compensation for the injected signal, e.g. wideband methods, the SDR architecture can be used to produce the carrier signal 21 shifted by a frequency fd, through simple reprogramming, such that the auxiliary signal 22 ends up at the frequency of the carrier frequency 21 which is used later. This means that the coupling is measured more exactly and a higher level of rejection is obtained.

Another embodiment even allows a frequency sweep, as is known from network analyzers, with the aim of determining a frequency response with amplitude and phase from a plurality of equidistant frequency spacings Delta_f. The compensation is then effected in the signal processor 6 through weighting with the reciprocal of the frequency response.

What is claimed is:

1. A method for operating an RFID read/write unit with transmitting signal suppression, the method comprising:
   providing the RFID read/write unit, the RFID read/write unit comprising a radio frequency part including a transmitter and a receiver, and a baseband part based on digital signal processing;
   producing an amplitude and phase weighted copy of a transmitting signal, namely a compensation signal, with the baseband part; and
   after linear modulation of the compensation signal, subtracting in an addition stage a resultant signal at an input of the receiver from a spurious coupling signal between the transmitter and the receiver, the transmitting signal having an auxiliary signal impressed upon a carrier signal from the RFID read/write unit with a frequency offset fd, for the purpose of processing without any DC voltage in the receiver downstream of an RX converter;
   wherein the input of the receiver comprises a turn-on and turn-off attenuation element which, when turned on, protects the radio frequency part against overdrive or against intermodulation in the RX converter so that weights can be ascertained for the copy of the transmitting signal and direct rejection of the coupling signal is achieved, the attenuation element subsequently being turned off and the RFID read/write unit changing to an operating mode and performing permanent readjustment of the transmitting signal suppression.

2. The method as claimed in claim 1, wherein the carrier signal is amplitude modulated with a small swing or a sideband signal added, wherein the transmitter produces the auxiliary signal at the frequency offset fd from the carrier signal and wherein the auxiliary signal appears in the receiver downstream of the direct RX converter as an AC signal at frequency fd and is detected in amplitude and phase relative to the auxiliary signal transmitted by the baseband part, with the aim of ascertaining the weights to reach transmitting signal suppression of the carrier signal.

3. The method as claimed in claim 1, wherein the RFID read/write unit shifts the frequency of the carrier signal by fd for a short time in order to measure the amplitude and phase of the auxiliary signal, such that the weights are ascertained for the purpose of rejecting the carrier signal on the actual transmission frequency, and when the weights have been ascertained the RFID read/write unit operates on its original frequency.

4. The method as claimed in claim 1, wherein the modulating auxiliary signal is implemented digitally in the baseband part and is then shifted to the radio frequency domain by means of a TX converter, and is amplified, and wherein the amplitude and phase weighted copy of the transmitting signal is likewise produced digitally in the baseband part and is shifted to the radio frequency domain by means of a linear modulator such that all the amplitude and phase relationships between the transmitting signal and the compensation signal are determined computationally by the signal processor and that the weighted copy of the transmitting signal can be turned on and off in order to be able to calculate direct rejection of the coupling signal.

5. The method as claimed in claim 1, wherein the auxiliary signal is modulated with a pseudo random sequence such that the spectrum of the auxiliary signal from the one, first RFID read/write unit for an electronic tag and a further, second RFID read/write unit appears as a weak noise signal and can be detected only by the one, first RFID read/write unit, which knows the sequence.

6. The method as claimed in claim 5, wherein correlation properties of pseudo random sequences are used in order also to isolate reflected and hence delayed signals from a coupling signal between a reception antenna and a transmission antenna and hence to allow them to be measured and compensated, for the purpose of increasing the sensitivity of the first RFID read/write unit.

7. The method as claimed in claim 1 wherein other forms of the auxiliary signal are also produced which are altered in frequency fd and are added as a single sideband signal to the carrier signal from the read unit in order to pick up a frequency response.

8. The method as claimed in claim 1, wherein when a frequency hopping method is applied the weights for each frequency are stored in a memory in a signal processor, in order to retrieve stored starting values for compensation upon repeat use of the same frequency.

9. An apparatus for transmitting signal suppression, the apparatus comprising:
   an RFID read/write unit, the RFID read/write unit comprising a radio frequency part and baseband part;
   wherein the radio frequency part includes a transmitter and a receiver;
   wherein the baseband part is based on digital signal processing and is configured to produce an amplitude and phase weighted copy of a transmitting signal, namely a compensation signal;
   wherein, after linear modulation of the compensation signal, the receiver is configured to subtract a resultant signal delivered to an input of the receiver from a spurious coupling signal between the transmitter and the receiver, the transmitting signal having an auxiliary signal impressed upon a carrier signal from the RFID read/write unit with a frequency offset fd, for the purpose of processing without any DC voltage in the receiver downstream of an RX converter;
   a turn-on and turn-off attenuation element provided in the receiver, wherein the attenuation element, when turned on, is configured to protect the radio frequency part against overdrive or against intermodulation in the RX converter so that weights can be ascertained for the copy of the transmitting signal and direct rejection of the coupling signal is achieved, and wherein, when the attenuation element is subsequently turned off, the RFID read/write unit changes to an operating mode and performs permanent readjustment of the transmitting signal suppression.

10. The apparatus of claim 9 wherein the carrier signal, the auxiliary signal and the compensation signal are implemented in the baseband part, and wherein the radio frequency part is constructed from linear basic blocks.

11. The apparatus as claimed in claim 10, wherein compensation for a number of coupling paths is made through at least one multiple implementation in order to produce weighted copies of the transmitting signal in the baseband part.

* * * * *